United States Patent [19]
Hollenbach et al.

[11] Patent Number: 5,533,115
[45] Date of Patent: Jul. 2, 1996

[54] NETWORK-BASED TELEPHONE SYSTEM PROVIDING COORDINATED VOICE AND DATA DELIVERY

[75] Inventors: Steven A. Hollenbach, Neshanic Station; Michael A. Martin, Hillsboro, both of N.J.; Thomas S. Novak, San Ramon, Calif.; Robert S. Warznak, Pennington, N.J.

[73] Assignee: Bell Communications Research, Inc., Morristown, N.J.

[21] Appl. No.: 334,120

[22] Filed: Nov. 4, 1994

Related U.S. Application Data

[63] Continuation-in-part of Ser. No. 168,612, Jan. 31, 1994.

[51] Int. Cl.[6] .................................................. H04M 3/42
[52] U.S. Cl. ...................... 379/220; 379/207; 379/201; 379/229; 379/265; 379/211; 379/266; 379/67
[58] Field of Search ................................ 379/97, 88, 89, 379/67, 201, 207, 211, 212, 220, 230, 94, 10, 15, 27, 219, 229, 265, 266

[56] References Cited

U.S. PATENT DOCUMENTS

| | | | |
|---|---|---|---|
| 5,008,930 | 4/1991 | Gaways et al. | 379/211 |
| 5,208,848 | 5/1993 | Pula | 379/97 |
| 5,241,580 | 8/1993 | Babson, III | 379/201 |
| 5,241,588 | 8/1993 | Babson, III et al. | 379/201 |
| 5,259,026 | 11/1993 | Johnson | 379/88 |
| 5,359,646 | 10/1994 | Johnson et al. | 379/27 |
| 5,361,295 | 11/1994 | Solomon et al. | 379/211 |

Primary Examiner—Jeffery Hofsass
Assistant Examiner—Scott Wolinsky
Attorney, Agent, or Firm—Leonard Charles Suchyta; Joseph Giordano

[57] ABSTRACT

A method of processing a phone call from a caller in a telephone network, the telephone network including a plurality of switches and an intelligent peripheral (IP) for interfacing the plurality of switches to a service control point (SCP). When a phone call is received at one of the plurality of switches, the call is sent to the IP. The IP then requests that the SCP perform a call processing request. Service logic within the SCP is accessed in order to process the phone call according to the call processing request. The service logic then requests and receives account information from one or more external systems. The phone call is routed to a selected telephone based on the account information received from the one or more external systems. The received account information is routed to the selected telephone.

11 Claims, 11 Drawing Sheets

NETWORK-BASED TELEPHONE SYSTEM PROVIDING COORDINATED VOICE AND DATA DELIVERY

CROSS REFERENCE TO RELATED APPLICATIONS

This application is a continuation-in-part application of U.S. patent application Ser. No. 08/168,612, filed on Jan. 31, 1994, the content of which is relied upon and incorporated by reference.

This application is also related to U.S. patent application 07/934,240 now abandoned, entitled "System and Method for Creating, Transferring, and Monitoring Services in a Telecommunication System," filed Aug. 25, 1992, by Zaher A. Nazif et al. ("the '240 application"); U.S. patent application 07/972,529 now abandoned, entitled "System and Method for Creating, Transferring, and Monitoring Services in a Telecommunication System," filed Nov. 6, 1992 by Zaher A. Nazif et al. ("the '529 application"); and U.S. Pat. No. 5,450,480, entitled "A Method of Creating a Telecommunication Service Specification," issued Sep. 12, 1995, by Susan K. K. Man et al. ("the '480 patent"). The contents of these three applications are also relied upon and incorporated by reference.

BACKGROUND OF THE INVENTION

The present invention relates generally to the field of network-based telephone systems, and more specifically to the problems of interaction between a caller and a network-based telephone system, accessing data from external systems, and providing data to a service agent.

The '240 application and '480 patent describe a system and method for creating customized telecommunication services and instantiating and maintaining the services in a call processing network. The system includes a Service Provisioning and Creation Environment (SPACE®, a registered trademark of Bellcore) application, which creates call processing records (CPRs). CPRs define how a received telephone call is processed for a particular customer. The CPRs are transferred to service control points (SCPs) to implement the services.

Switches in the network needing information to process a call send queries to the SCPs. A Multi-Services Application Platform (MSAP) in the SCP accesses a CPR based on a "key" associated with the call. MSAP processes the nodes of the CPR and issues corresponding call processing instructions back to the switch. The switch routes the call based on the instructions.

While executing a CPR, the SCP may request information from the caller using certain nodes. The type of information which the SCP can request is somewhat limited, however. For example, the SCP can request the caller to insert a PIN number. This limited interaction between a caller and the SCP may be inadequate to complete the call, requiring a service agent to intervene and handle the call manually. Of course, manual call processing is typically slower and more costly than automated call processing.

Other than these inputs from a caller, MSAP cannot access information from external systems. Instead, MSAP can only access information that is available at the SCP running MSAP. Again, this information may be inadequate to properly execute the call processing.

Accordingly, it is desirable to increase the intelligence of a system for processing telephone calls.

It is also desirable to increase the flexibility in a system for processing telephone calls.

It is also desirable to provide greater interaction between a caller and a system for processing telephone calls.

It is also desirable to provide greater accessibility to information from external systems by a system for processing telephone calls.

It is also desirable to augment the existing process of directing calls to service agents.

It is also desirable to route a caller to the appropriate agent based on information about the caller.

It is also desirable to provide routing of a call to the appropriate agent while routing data associated with the call to a display terminal of the same agent.

It is also desirable to provide network reliability in routing a caller to the appropriate agent.

Additional desires of the invention will be set forth in the description which follows, and, in part, will be apparent from the description or may be learned by practice of the invention. The advantages of the invention may be realized and obtained by means of the instrumentalities and combinations particularly pointed out in the appended claims.

DISCLOSURE OF THE INVENTION

To achieve the foregoing desires and objects, and in accordance with the purposes of the invention as embodied and broadly described herein, a method of processing a phone call of the present invention comprises the steps of receiving the phone call at a switch, requesting call processing instructions from the SCP, accessing, at the SCP, service logic which specifies handling of the phone call corresponding to the call processing instructions, requesting, at the SCP, data from one or more external systems according to the service logic, receiving, at the SCP, data from the one or more external systems according to the service logic, routing the phone call to an appropriate agent based on the data received from the one or more external systems, and routing the data to the same agent.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred implementations of this invention and, together with the general description given above and the detailed description of the preferred implementations given below, serve to explain the principles of the invention.

In the drawings.

BEST MODE FOR CARRYING OUT THE INVENTION

Figure 1:
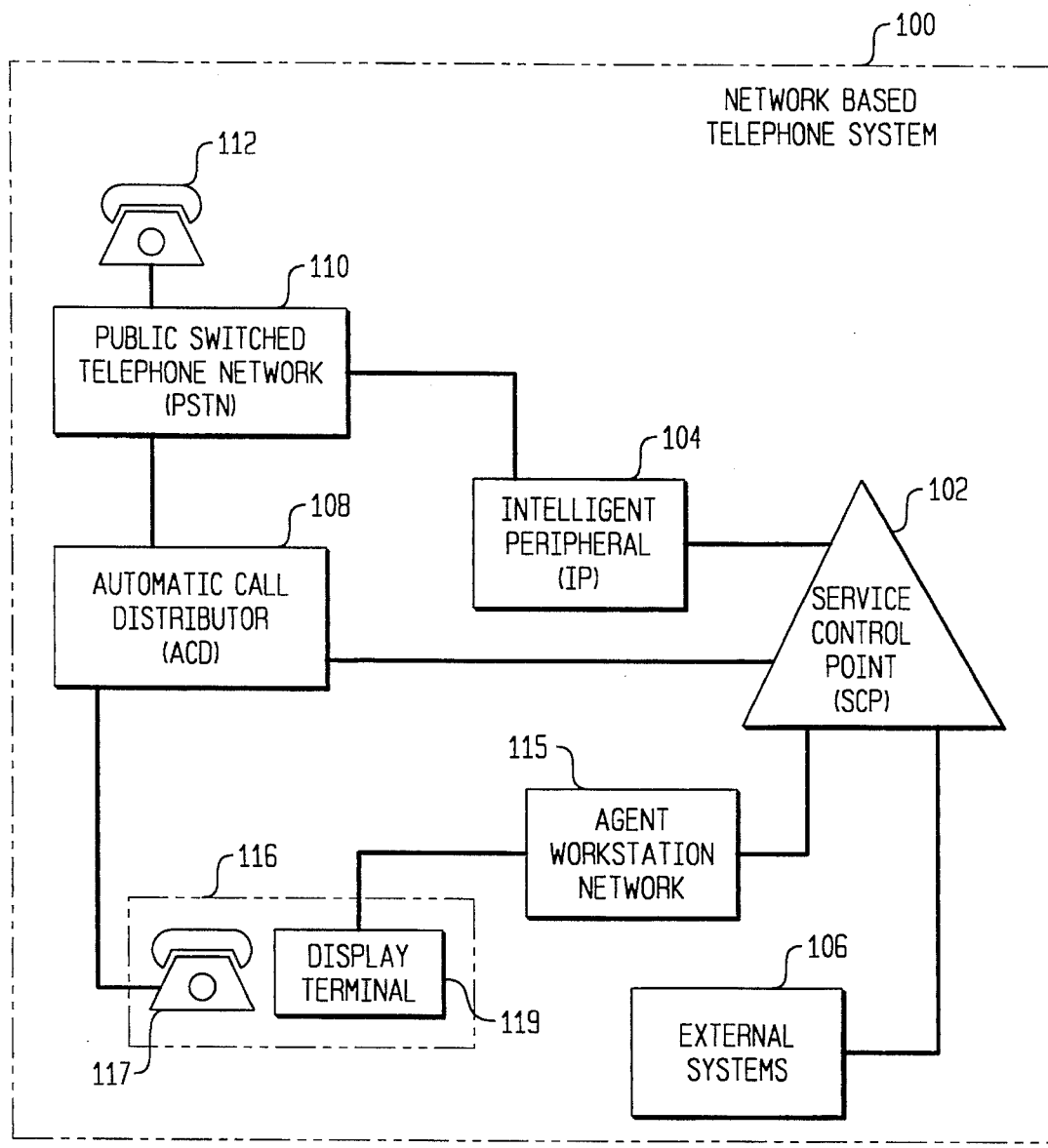
FIG. 1 is a block diagram of a network-based telephone system in accordance with the present invention.

As shown in FIG. 1, a preferred embodiment of a network-based telephone system 100 of the present invention includes the conventional elements of the public switched network 110, a plurality of telephones 112 (only one shown), an automatic call distributor (ACD) 108, an intelligent peripheral (IP) 104, a service control point (SCP) 102, external systems 106, an agent workstation network 115, a plurality of agent workstations 116 (only one shown) each having a telephone 117 and a display terminal 119.

Public switched network 110 is connected to ACD 108 and IP 104. ACD 108 is connected to telephones 117 of agent workstations 116 and SCP 102. IP 104 is connected to public switched network 110 and is also connected to SCP 102, which is connected to external systems 106 and agent workstation network 115. Agent workstation network 115 is connected to display terminals 119 of agent workstations 116.

A call placed by a caller on telephone 112 is received by public switched network 110 and forwarded to IP 104. One of the functions of the IP 104 is to interface as an intelligent speech peripheral with the caller on telephone 112. For example, IP 104 can preferably play digitized announcements to a caller, prompt the caller to enter call processing information, and collect call processing information.

When a call is routed to IP 104 from public switched network 110, IP 104 requests instructions from SCP 102 on how to handle the call. As described in more detail below, the SCP 102 provides interface instructions to the IP 104 based on a call processing record. The caller-to-IP 104 connection, therefore, becomes an intelligent interactive communication, with the SCP 102 providing instructions to the IP 104 in response to information provided by the caller. The use of the SCP 102 in conjunction with IP 104 automates the call processing and substantially reduces agent time for handling routine tasks.

If necessary, the SCP may instruct the IP 104 to route the caller 112 to ACD 108. The SCP 102 will instruct the IP 104 as to the desired ultimate destination for the caller 112 (i.e., a particular agent or group of agents). The ACD 108 will then manage the connection of the caller 112 to an agent's telephone 117 based on various criteria. As the caller progresses through the ACD 108, ACD 108 informs the SCP 102 of this progress. In a preferred embodiment, ACD 108 is an AT&T 5ESS Pinnacle™ ACD, however, any known type of ACD could be used.

Preferably, IP 104 also provides additional functions such as automatic outbound dialing, where IP 104 places a call to an outside telephone 112 according to instructions received from SCP 102.

In a preferred embodiment, IP 104 is a Periphonics VPS 9000 or Bellcore Intelligent Services Peripheral (ISP), vers. 2.0.

External systems 106 preferably include databases or other network-based systems, which contain data that is useful in processing a call, including, for example, account status data, repair information, customer profile data, and ordering information. Account status data may indicate whether a customer is in good standing or whether the customer's service has been suspended for nonpayment. Repair information may indicate the repairs that have been made to a particular telephone line, whether a particular line is in service, and the type of problems a particular line is experiencing. Customer profile data may contain information about the customer that may be useful in directing the customer's call, such as the type of services that are installed and the geographical location of his telephone line. Ordering information may include, for example, the costs of services and the availability of services to particular customers. External systems 106 may comprise various hardware structures, including, for example, an IBM TN-3270 database.

As described above, ACD 108 may also distribute the call to an agent workstation 116 according to instructions received by SCP 102. An agent at agent workstation 116 may be a regular service agent capable of handling various customer needs or a specialized service agent capable of handling specific customer needs. Based on information received from IP 104 and external systems 106, SCP 102 may direct ACD 108 to distribute the call to an appropriate agent workstation 116. For example, a caller may be routed to the collections department if the caller's account has been suspended for non-payment. Or, a caller may be routed to an agent specializing in "work-at-home" accounts if the caller's line is used in a home office. In handling a call, an agent may have access to data stored in external systems.

Figure 2:
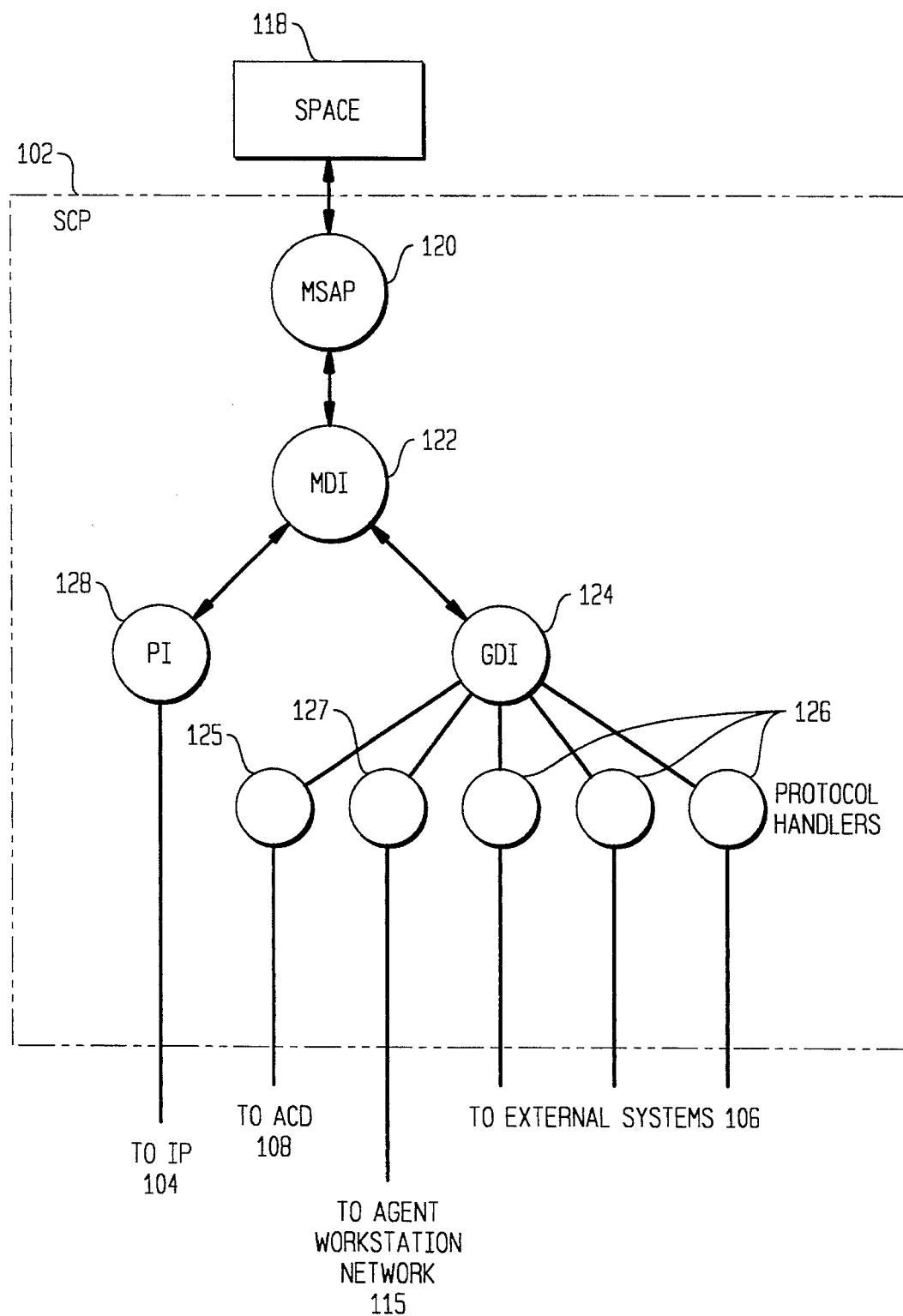
FIG. 2 is a block diagram of a service control point (SCP) in accordance with the present invention.

FIG. 2 shows a block diagram of SCP 102 architecture according to a preferred embodiment of the present invention. As shown, the SPACE 118 application interfaces with the MSAP application 120. Although SPACE 118 is shown outside SCP 102, in an alternate embodiment, SPACE 118 may be included in SCP 102. MSAP 120 communicates with Message Delivery Interface (MDI) interface 122, which delivers messages from MSAP 120 to either peripheral interface (PI) 128 or generic data interface (GDI) 124. MSAP 120, an application that is resident in the SCP 102, executes the service logic of the accessed call processing record and issues instructions to the other elements of the system 100.

PI 128 interfaces IP 104 to SCP 102 and allows these two devices to communicate. GDI 124 transmits requests for data to the appropriate external systems 106 via protocol handlers 126 and packages the data received from the external systems 106 into a message to be transmitted to and used by MSAP 120. GDI 124 can also send data resident in, or retrieved by, SCP 102 to the external systems. In addition, GDI 124 sends and retrieves data to and from ACD 108 and agent workstation network 115 via ACD protocol handler 125 and agent protocol handler 127, respectively. PI 128 and GDI 124 are described in detail below.

PI 128 establishes and maintains a data network communication link between IP 104 and SCP 102. PI 128 also handles asynchronous transmission of messages between IP 104 and SCP 102. Further, PI 128 translates messages into a format understood by either IP 104 or SCP 102. In a preferred embodiment, the message formats supported by PI 128 are described in published Bellcore Documents TR-TSY-000402, July 1989 (hereinafter TR402 format) and TA-NWT-001129, October 1992 (hereinafter TA1129+ format), which are understood by IP 104 and SCP 102, respectively. However, other message formats could be used by IP 104 and SCP 102.

Figure 3:
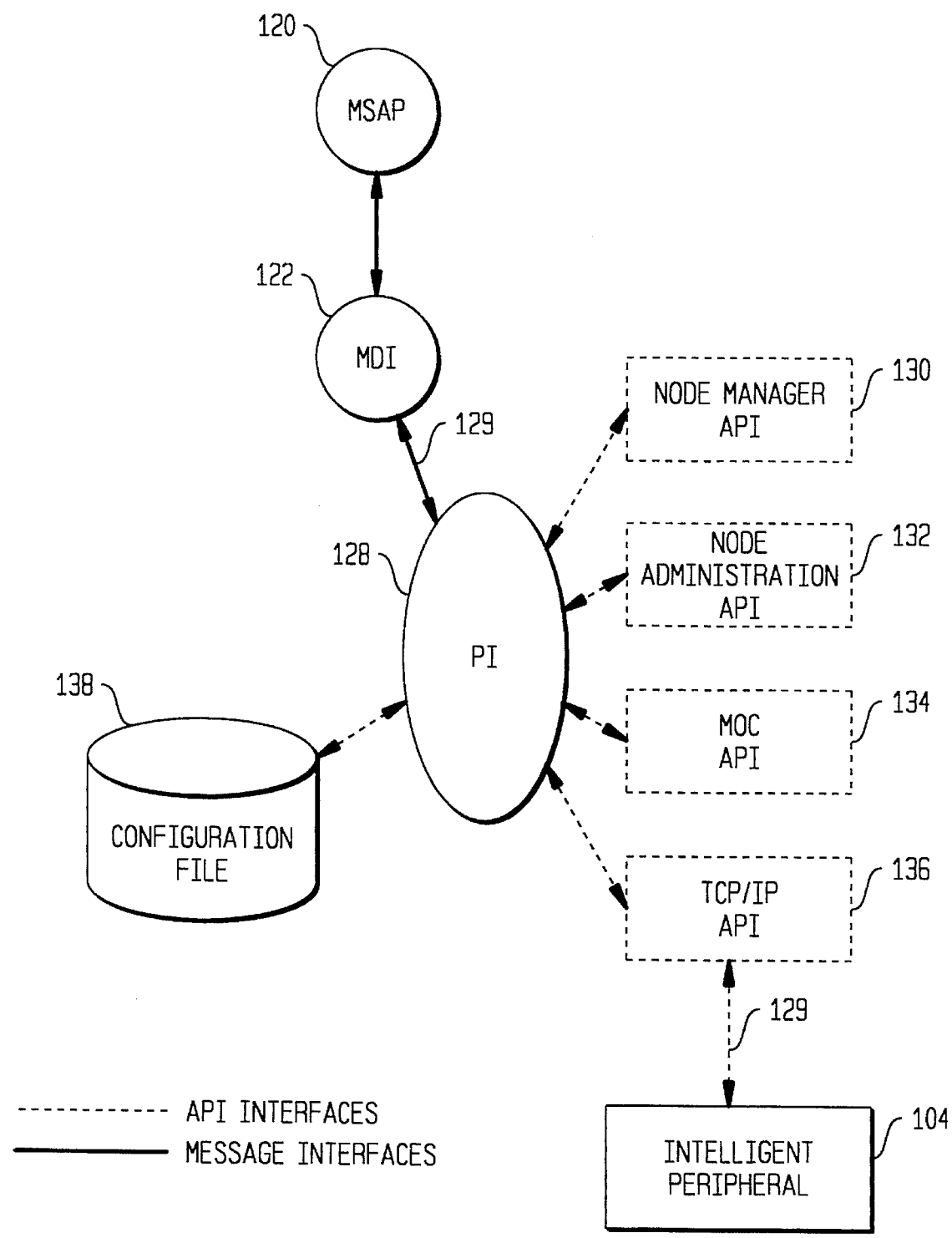
FIG. 3 shows the internal interfaces of a peripheral interface (PI) in accordance with the present invention.

Referring to FIG. 3, during normal operation, PI 128 is simultaneously waiting for messages from IP 104 and MSAP 120. Messages received by PI 128 are added to a queue 129, while messages transmitted from PI 128 are removed from the queue 129.

FIG. 3 shows the internal interfaces of PI 128, including Node Manager Application Programming Interface (API) 130, Node Administration API 132, Maintenance Operations Console (MOC) API 134, transaction control protocol/internet protocol (TCP/IP) API 136, Configuration File 138, and Message Delivery Interface (MDI) 122.

Node Manager API 130 is responsible for maintaining the reliability of SCP 102 by monitoring the status of the nodes in SCP 102. Node Administration API 132 contains information regarding the configuration of SCP 102 such as the addresses of each IP 104 connected to SCP 102. MOC API 134 interfaces a computer terminal, not shown in the drawings, with SCP 102 to permit, for example, a technician to conduct maintenance on SCP 102. TCP/IP API 136 provides an interface between SCP 102 and IP 104 using the TCP protocol.

Configuration File 138 contains information relevant to the operations of PI 128. This information includes parameters for configuring PI 128, such as identifying the addresses of IPs 104 and specifying the priority of a message in queue 129. Changes to the configuration file 138 are preferably effected upon initialization of PI 128.

Figure 4:
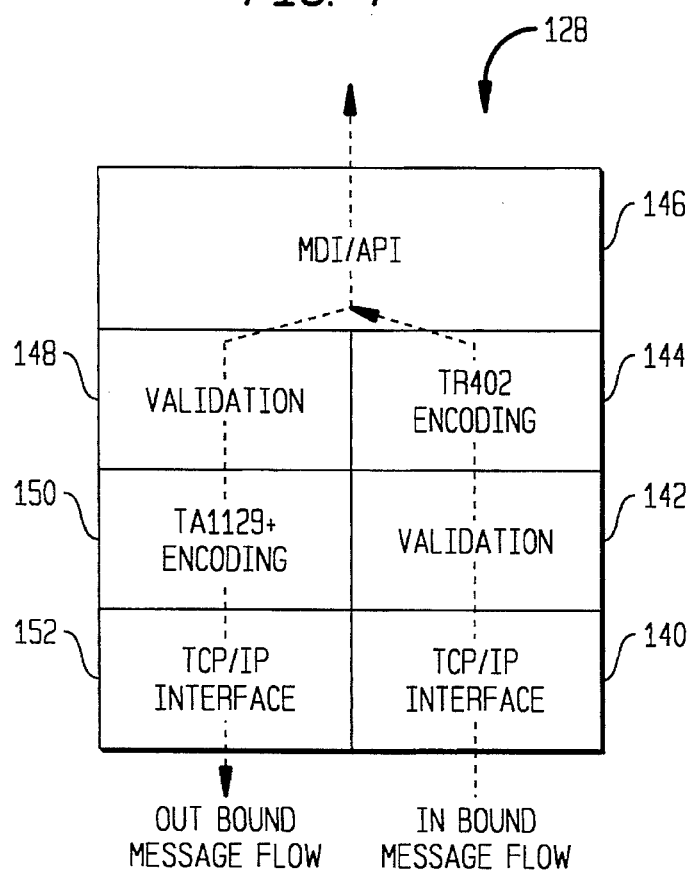
FIG. 4 is a schematic representation of software modules corresponding to a PI in accordance with the present invention.

In a preferred embodiment, PI 128 is implemented as software. FIG. 4 depicts a block diagram of the preferred software modules of PI 128. In PI 128, a message is received by module 140 from IP 104. The received message is then validated by module 142 and encoded by module 144 to a format understandable by MSAP 120. Module 146 transmits to and receives messages from MSAP 120 through MDI 122. Module 148 validates a message received from MSAP 120 and module 150 encodes the message in a format understood by IP 104. Module 152 provides the message to IP 104.

In processing a received message, PI 128 determines whether a translation is required. If so, PI 128 decodes the received message and determines whether the message is valid. PI 128 then converts the message to a format understood by the receiving device using conversion tables (not shown). For example, a message being received by IP 104 from SCP 102 is converted from TR402 format into TA1129+ format and vice-versa.

If PI 128 receives an invalid message from IP 104, the message is dropped and further processing of the message ceases. Timers in IP 104 then either resend the message or transfer the call. If PI 128 receives an improperly formatted message from MSAP 120, PI 128 returns an error message to MSAP 120.

Figure 5:
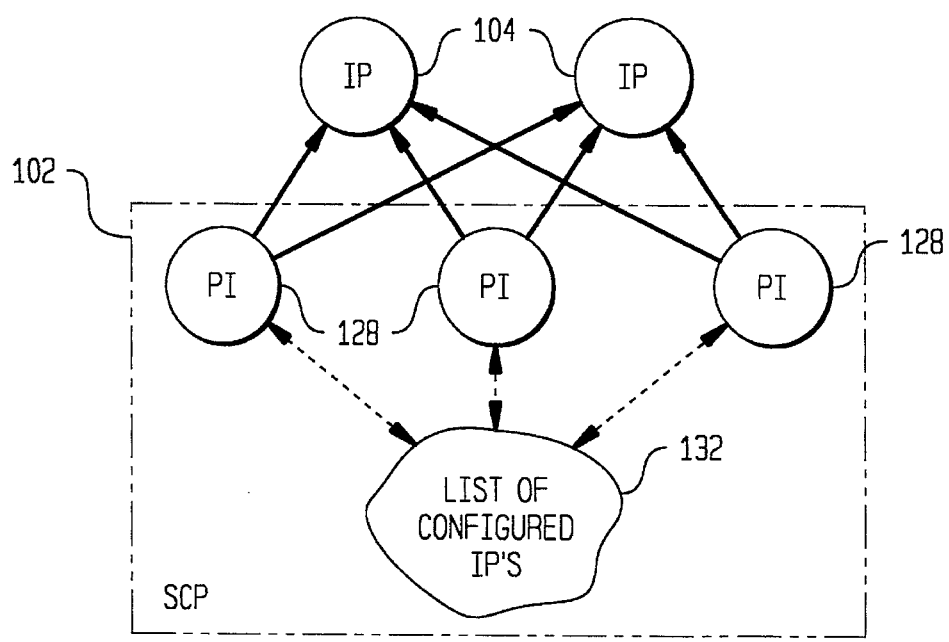
FIG. 5 shows a configuration having a plurality of intelligent peripherals (IPs) interfaced with a plurality of PIs in accordance with a preferred embodiment of the present invention.

FIG. 5 shows a preferred embodiment of the present invention having redundant connections between a plurality of IPs 104 and SCP 102 to provide high system reliability. SCP 102 distributes transactions in a "round-robin" fashion to each of a plurality of PIs 128. PIs 128 are configured to make redundant connections with one or more IPs 104. Thus, in the case of a failed connection, a message can still be transmitted between IP 104 and SCP 102.

Each PI 128 attempts to keep all configured connections, including redundant connections, active at all times. PI 128 logs the general status of each of its circuit connections, indicating whether the connection is good, degraded, or poor. A good connection indicates that all the configured connections are active; a degraded connection indicates that at least one, but not all, connections have failed; and a poor connection indicates that all connections have failed.

When any connections have failed, a periodic timer mechanism in PI 128 causes PI 128 to make another attempt to establish the connection after a predetermined time. When all the configured circuits are active, PI 128 deactivates its periodic timer mechanism. When an active circuit returns an unexpected error, that circuit is considered failed and the periodic timer of PI 128 reactivates and attempts are made to reestablish the circuit. A badly formed message received over a circuit is considered to be a circuit failure, resulting in activation of the periodic timer of PI 128.

GDI 124 gives MSAP 120 transparent real time access to information stored in external systems 106 by allowing MSAP 120 to request information without knowledge of the source of that information.

Figure 6:
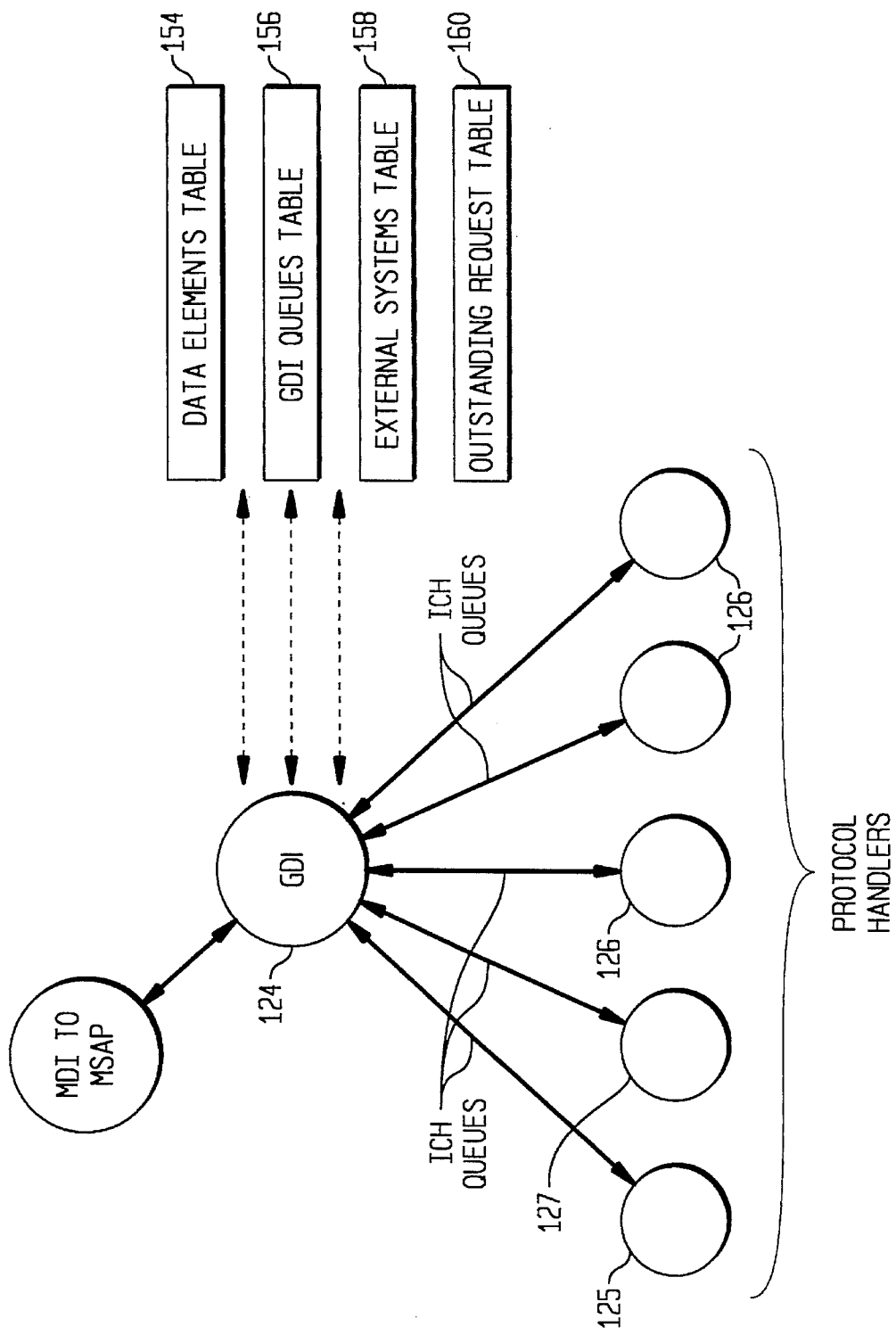
FIG. 6 illustrates internal tables which interface with a generic data interface (GDI) in accordance with the present invention.

FIG. 6 illustrates internal tables stored in GDI 124 for handling requests for information from MSAP 120. These tables include Data Elements Table 154, GDI Queues Table 156, External Systems Table 158, and Outstanding Request Table 160. Data Elements Table 154 is used by GDI 124 to forward a request for data to the appropriate external systems 106. GDI Queues Table 156 is used by GDI 124 and protocol handlers 126 to determine what queue names to use for exchanging messages. External Systems Table 158 is used by protocol handlers 126 to obtain addressing information for communicating with external systems. Outstanding Request Table 160 is used to maintain a list of outstanding requests by GDI 124.

Protocol handlers 126 manage the physical and logical connections to external systems 106 and interact with external systems 106 to retrieve information. In a preferred embodiment, each external system 106 has a corresponding protocol handler 126.

ACD protocol handler 125 manages the physical and logical connection to ACD 108 and interacts with ACD 108 to receive status information on calls queued within ACD 108. ACD protocol handler 125 is discussed in more detail below.

Agent protocol handler 127 manages the physical and logical connection to agent workstation network 115 and interacts with agent workstation network 115 to send information needed to serve a call to the display terminal 119 of the agent workstation 116 to which the call is routed by ACD 108 at the time that the call is routed to that agent workstation 116. Agent protocol handler 127 is discussed in more detail below.

Figure 7:
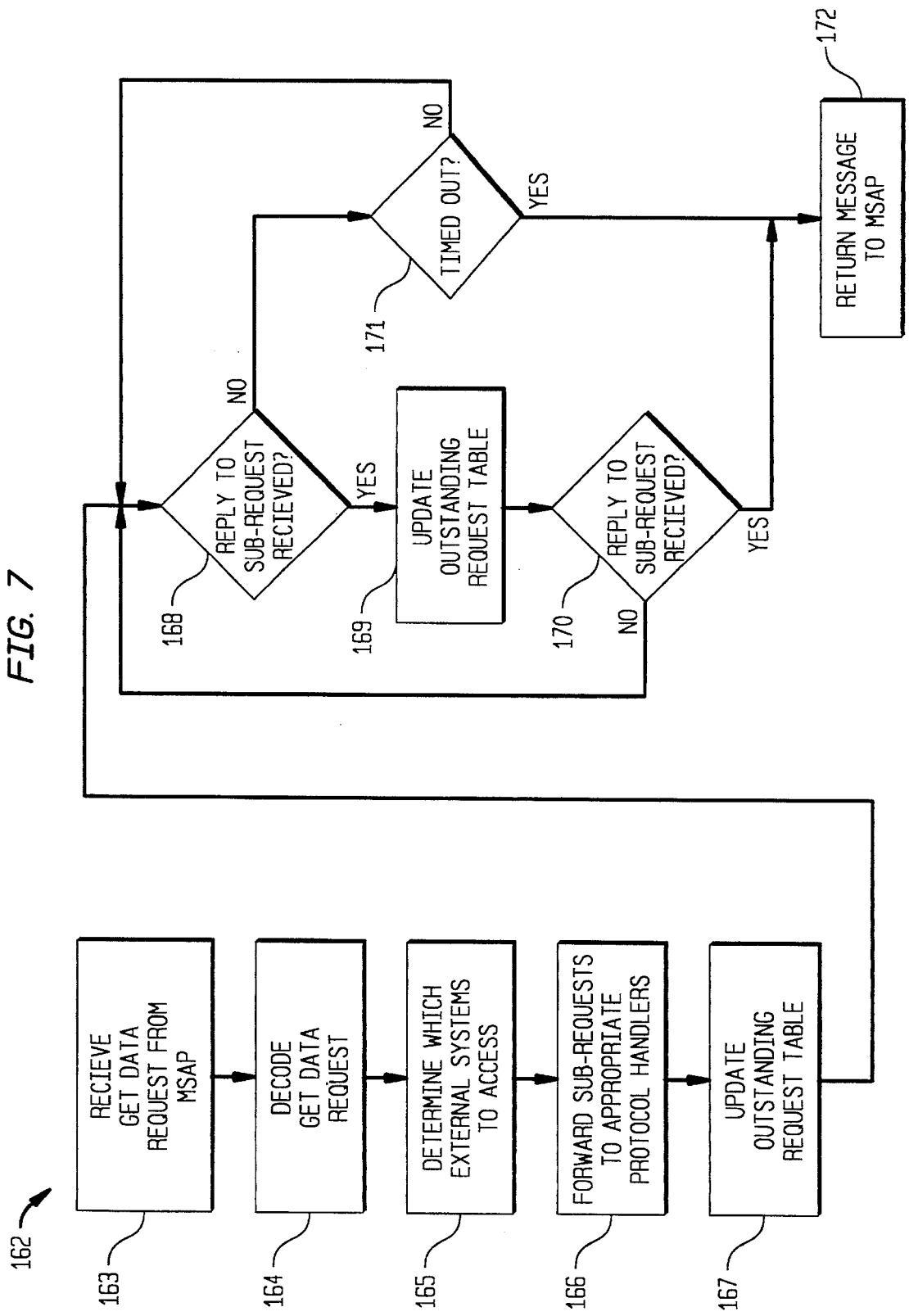
FIG. 7 is a flowchart illustrating an operation of a GDI in accordance with a preferred embodiment of the present invention.

With reference to flowchart 162 shown in FIG. 7, the manner in which GDI 124 handles a request for data from MSAP 120 will now be described. Initially, GDI 124 receives a GetData request, described in detail below, from MSAP 120 (step 163). GDI 124 decodes the GetData request to determine the specific data elements being requested by MSAP 120 (step 164). Using Data Elements Table 154, GDI 124 determines which external systems 106 should be accessed to obtain the requested data elements (step 165). Data Elements Table 154 is a lookup table which identifies which of external systems 106 the specific data elements are located. Thus, once GDI 124 has decoded the GetData request and determined the specific data elements requested by MSAP 120, GDI 124 may look up the external system corresponding to each specific data element in Data Elements Table 154. GDI 124 then forwards "sub-requests" requesting the data elements to protocol handlers associated with the appropriate external systems (step 166). Outstanding Request Table 160 is updated to keep track of the outstanding "sub-requests" (step 167).

GDI 124 then determines whether a reply has been received (step 168). If a reply is received by GDI 124 from external systems 106, Outstanding Request Table is updated to keep track of the partial completions (step 169).

GDI 124 then determines if all of the replies to the sub-requests have not been returned (step 170). If not, GDI 124 waits for additional replies. If all of the replies have been received, GDI 124 returns the completed message to MSAP 120 (step 172).

If at step 168 GDI 124 determines that a reply has not been received, the message will also be returned to MSAP 120 (step 172) if a predetermined time passes (step 171). Thus, a message is returned to MSAP 120 when all of the outstanding sub-requests have been responded to or timed out.

Figure 8:
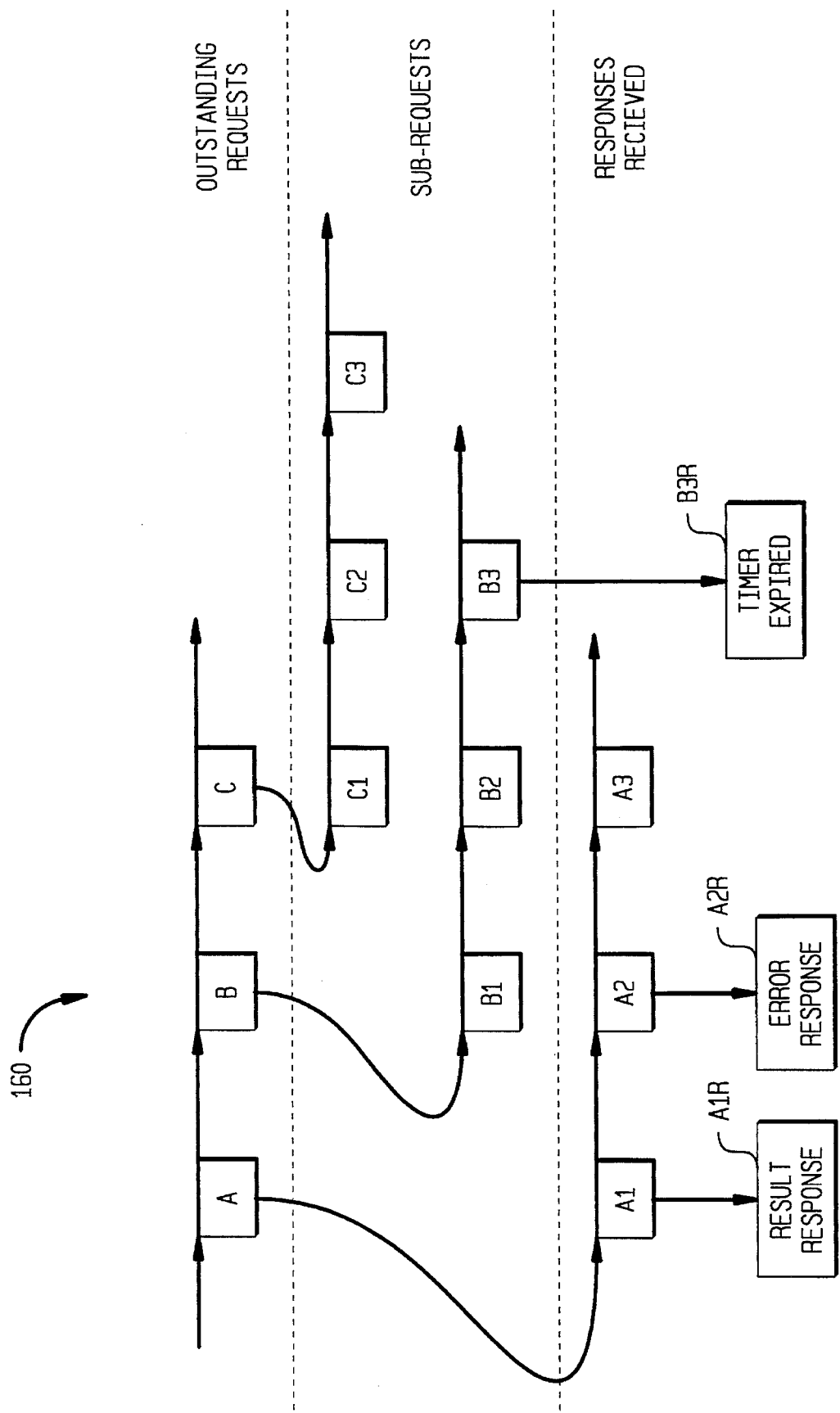
FIG. 8 illustrates sub-requests in an Outstanding Request Table in accordance with the present invention.

FIG. 8 depicts the GDI Outstanding Request Table 160. Blocks A, B, and C represent outstanding requests received by GDI 124 from MSAP 120. Blocks A1, A2, and A3; B1, B2, and B3; and C1, C2, and C3 represent sub-requests created from outstanding requests A, B, and C, respectively. Blocks A1R, A2R, and B3R represent responses received by GDI 124 in response to sub-requests A1, A2, and B3, respectively.

Outstanding Request Table 160 is constructed and updated as each request for information from MSAP 120 is received by GDI 124. Upon receiving a request from MSAP 120, GDI 124 creates sub-requests, which are forwarded to the appropriate protocol handler. GDI 124 awaits a response for each outstanding sub-request.

Three types of responses may be stored in Outstanding Request Table 160. First, GDI 124 may store response A1R from external systems 106, indicating that a result was received in response to the sub-request. Second, GDI 124 may store response A2R from external systems 106, indicating that an error was received from external systems 106. Such an error may indicate that external systems 106 are unable to process the sub-request. Finally, GDI 124 may store response B3R, indicating that no response was received from external systems 106 within a predetermined time.

As explained in the incorporated '240 and '529 applications, and '480 patent, nodes are the basic units that define the logical operations to be performed during call processing. MSAP 120 processes the nodes and issues corresponding requests or instructions to the other elements of system 100. These incorporated patent applications describe various nodes supported by MSAP 120 including GetData, SendData, and WaitForEvent nodes. In a preferred embodiment of the present invention, the GetData, SendData, and WaitForEvent nodes may be modified as described below. Also, the present invention contemplates a TransferCall node, also described below.

The GetData node allows MSAP 120 to request data from external systems 106 for a particular account. A GetData request issued by MSAP 120 includes a handle call variable, accounts ID, and a list of call variables. The handle call variable identifies a GetData request and is used to retrieve the requested information and check the status of the request. The account ID identifies the caller's account. The list of call variables specify the data requested by MSAP 120 from the external systems 106.

Upon receiving a GetData request from MSAP 120, GDI 124 determines which external systems 106 contain the requested data as described above. GDI 124 formats and transmits sub-requests based on the GetData request received from MSAP 120 to the appropriate external systems. GDI 124 waits for a response for each of the sub-requests before returning all of the requested information to MSAP 120. If GDI 124 does not receive a reply to all of the sub-requests after a predetermined time, an error indication is returned to MSAP 120 along with the data that was received. While information may be returned to MSAP 120 from GDI 124, the information is not available for use by MSAP 120 until after MSAP 120 executes a WaitForEvent node.

The SendData node allows MSAP 120 to send data to external systems 106 and agent workstation network 115. A SendData request issued by MSAP 120 to external systems 106 contains a handle call variable, account ID, and a list of call variables along with corresponding data. The handle call variable identifies a SendData request and is used to obtain the status of the request. The information corresponding to the list of call variables is stored in the external systems 106 according to the account ID.

Upon receiving a SendData request from MSAP 120, GDI 124 determines where it should send the data. GDI 124 formats the data from the received SendData request and transmits the formatted data to the appropriate protocol handlers. GDI 124 waits for positive acknowledgment from the protocol handlers indicating that the data has been accepted before sending a status reply to MSAP 120. However, the status of the SendData request is not available to MSAP 120 until after MSAP 120 executes a WaitForEvent node.

The WaitForEvent node gives MSAP 120 access to the data or status of a GetData or SendData request. The WaitForEvent instruction specifies a handle call variable, which corresponds to a handle call variable specified in a GetData or SendData request. All requests returned to MSAP 120 from a GetData or SendData request are not available to MSAP 120 until after MSAP 120 executes a WaitForEvent node. When a WaitForEvent instruction has been issued, no further instructions are executed by MSAP 120 until the requested information has been returned. When a reply has been returned, the information is assigned to the call variables specified in the request and the status of the request is returned.

While the GDI 124 is retrieving the requested information, MSAP 120 may issue additional instructions to IP 104, for example, to obtain additional information from the caller or to play digitized messages before a WaitForEvent request is issued. In this way, caller 112 is not simply waiting for MSAP 120 to receive a reply to a request.

The TransferCall node allows MSAP 120 to instruct public switched network 110 to route a call to an agent workstation 116, together with data about caller 112. The TransferCall instruction, preferably including a transfer number and account number, can be transmitted, for example, to ACD 108 where the call is queued and subsequently routed to a specialized agent workstation 116 identified by the transfer number.

Figure 9:
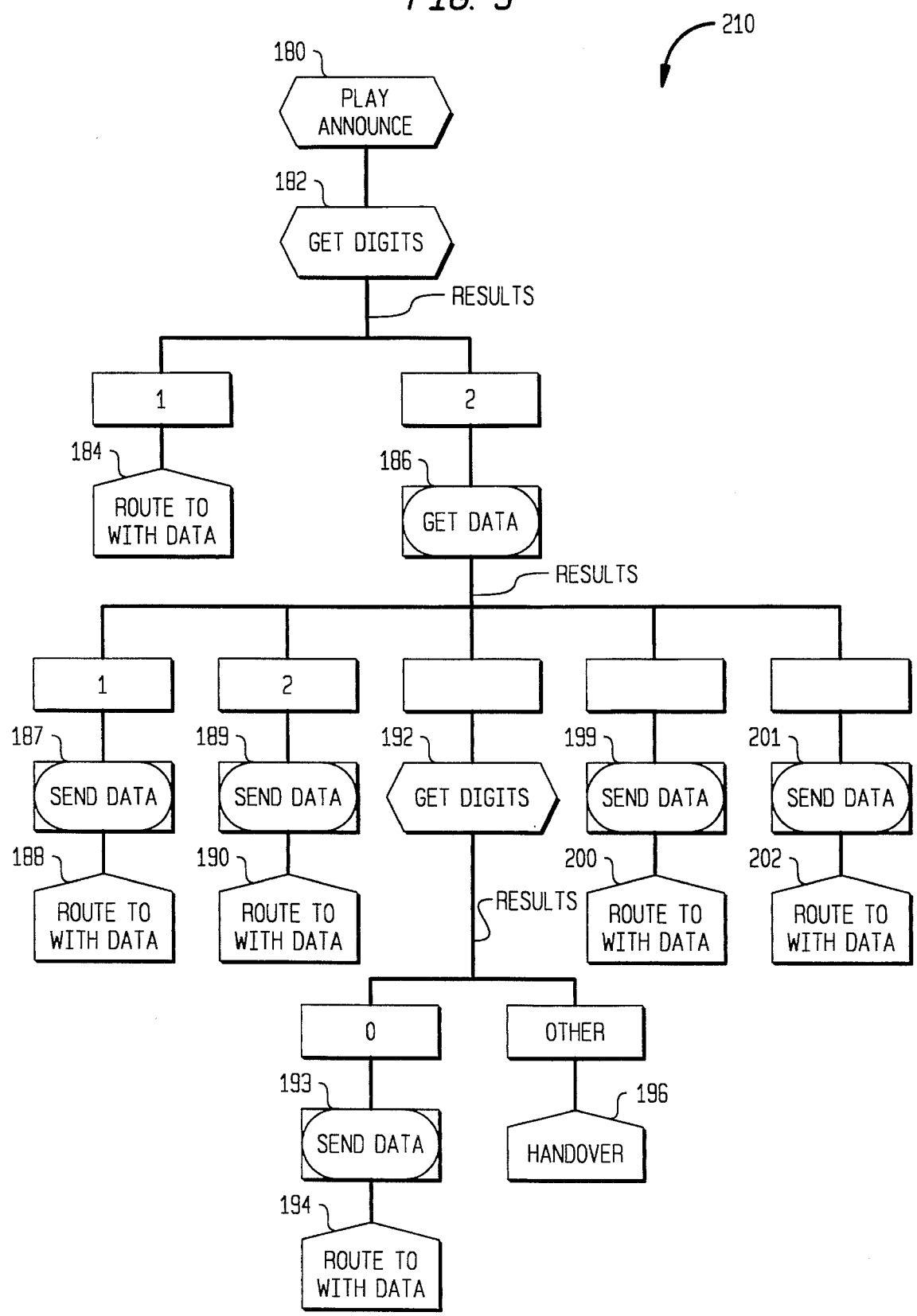
FIG. 9 illustrates an example of a call processing record in accordance with the present invention.

To illustrate the operation of system 100, FIG. 9 shows an example of a call processing record designated by numeral 210. In this example, call processing record 210 routes the caller to a "specialized" agent based on the caller's profile.

After a received call has been routed to IP 104, IP 104 requests call processing instructions from SCP 102. Based on predetermined information in the call, such as the account number or telephone number, SCP 102, under the control of MSAP 120, executes a corresponding call processing record 210.

As shown in the example of FIG. 9, PlayAnnouncement node 180 instructs IP 104 to welcome the caller with a digitized announcement. GetDigits node 182 causes IP 104 to ask the caller to enter the caller's account number or telephone number. MSAP checks the result of the digit collection request to decide if the caller responded to the prompt because, for example, the caller may not have touch tone. If the result is a "1," indicating that the entered telephone number is in error, MSAP 120 executes RouteToWithData node 184, causing the call to be routed to a "regular" (i.e. non-specialized) representative. If the result is a "2," indicating that the telephone number has been verified by MSAP 120, MSAP 120 executes a GetData node 186, requesting customer profile information from GDI 124.

If the result to the GetData request is a "1," indicating that the caller is a particular market customer, SendData node 187 and RouteToWithData node 188 are executed, sending the collected data and routing the caller to an agent specialized in handling the particular market customer.

If the result to the GetData request is a "2," indicating that the caller "works at home," SendData node 189 and RouteToWithData node 190 are executed, sending the collected data and routing the caller to an agent specialized in handling customers who "work at home."

If the result to the GetData request is a "3," indicating that the account is a residential account, GetDigits node 192 is executed, causing IP 104 to prompt the caller to choose between a residential agent or automated application. If the caller inputs a "0" choosing a residential agent, the caller is routed to an agent specializing in residential accounts by RouteToWithData node 194 and the associated data is also sent to this agent by SendData node 193. If the caller presses any other key, indicating automated applications, Handover node 196 is executed, causing the call to be handled by another call processing record.

If the result to the GetData request is a "4," indicating that the account has been suspended for nonpayment, SendData node 199 and RouteToWithData node 200 are executed, sending the collected data and routing the call to the collections department.

Finally, if the result to the GetData request is a "5," indicating that the customer profile does not satisfy any of the other choices, the caller is routed to a "regular" representative by RouteToWithData node 202 and the collected data is sent to this agent by SendData node 201.

Figure 10:
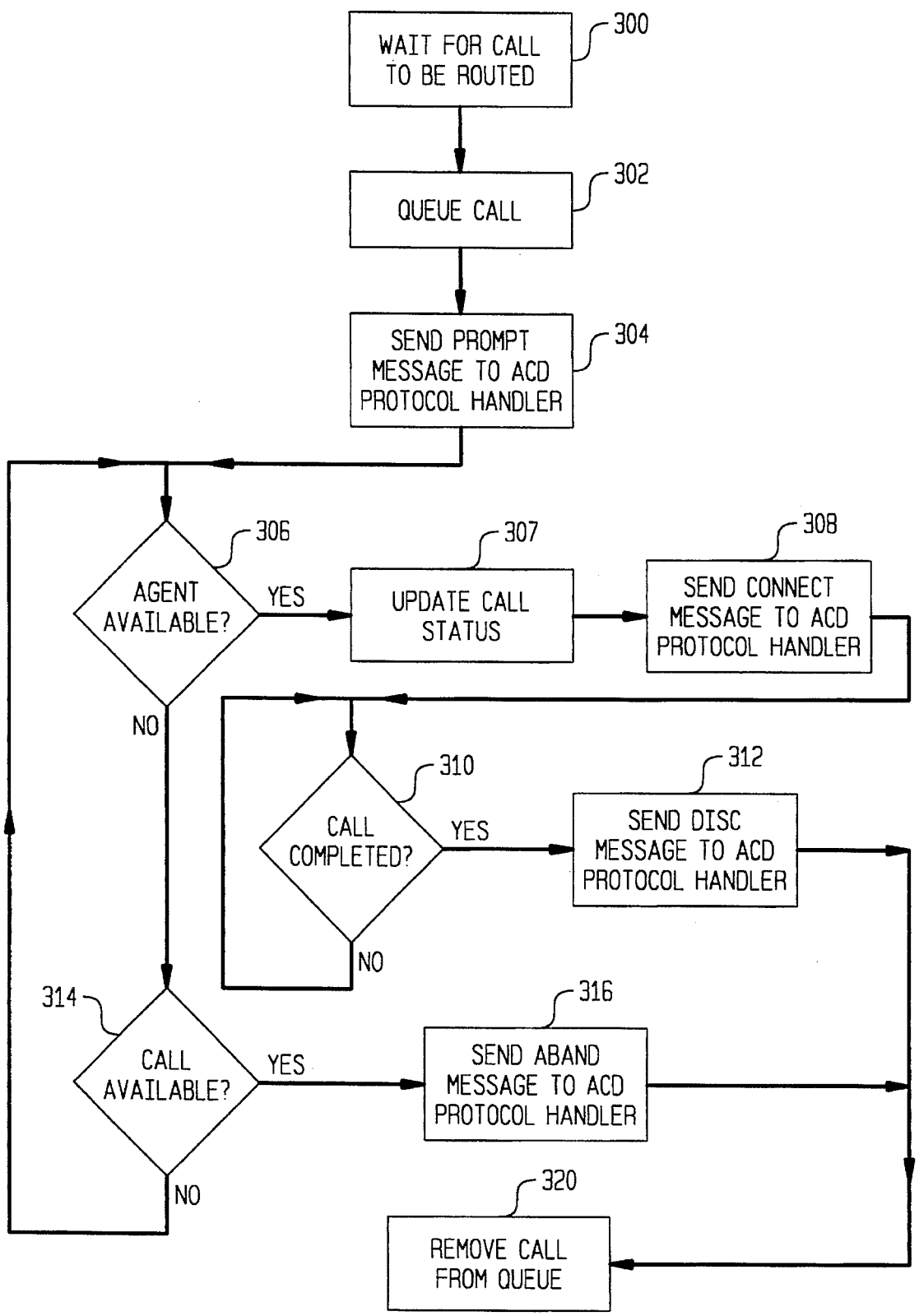
FIG. 10 is a flowchart showing the operation of ACD 108.
Figure 11:
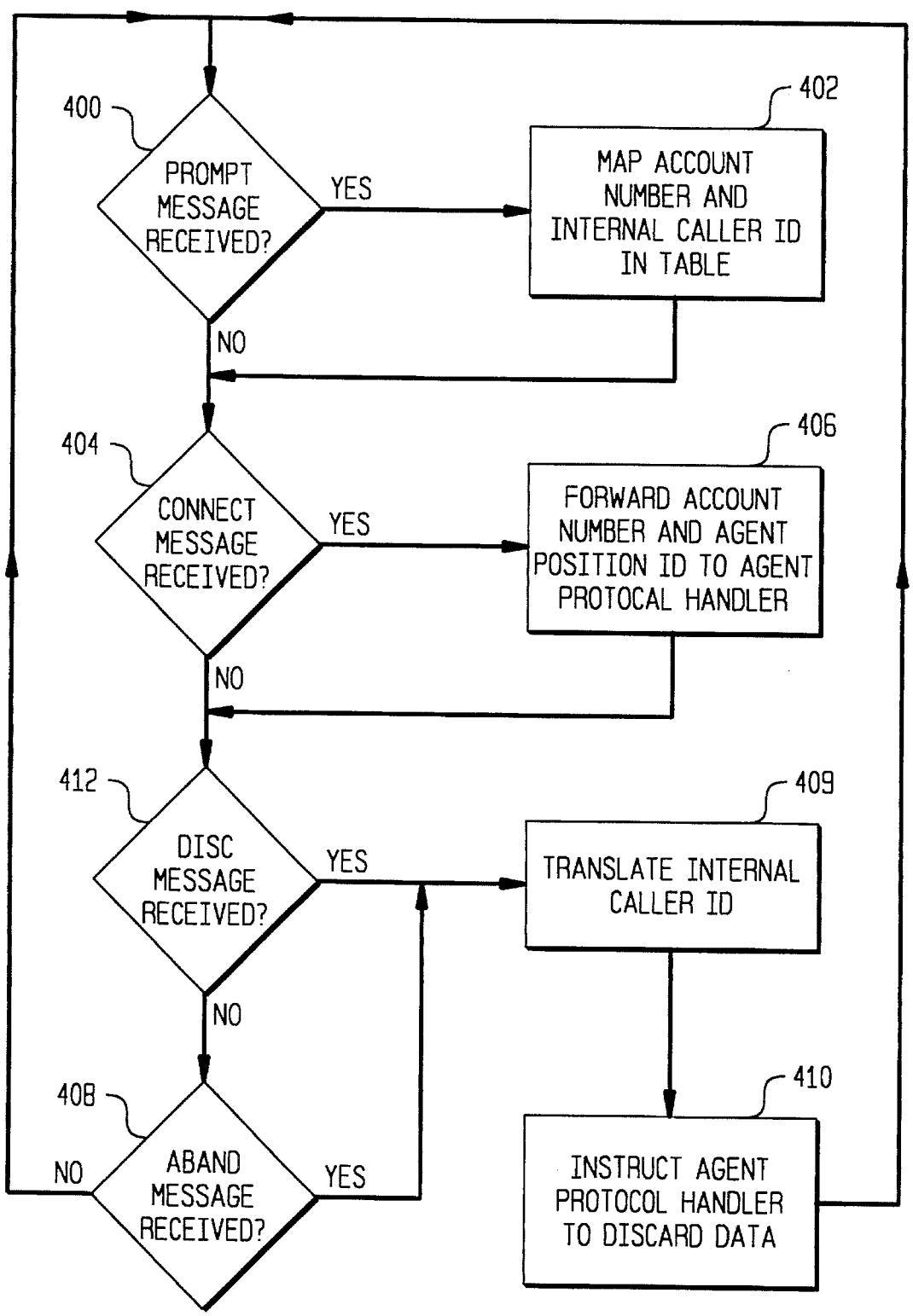
FIG. 11 is a flowchart showing the operation of ACD protocol handler 125.
Figure 12:
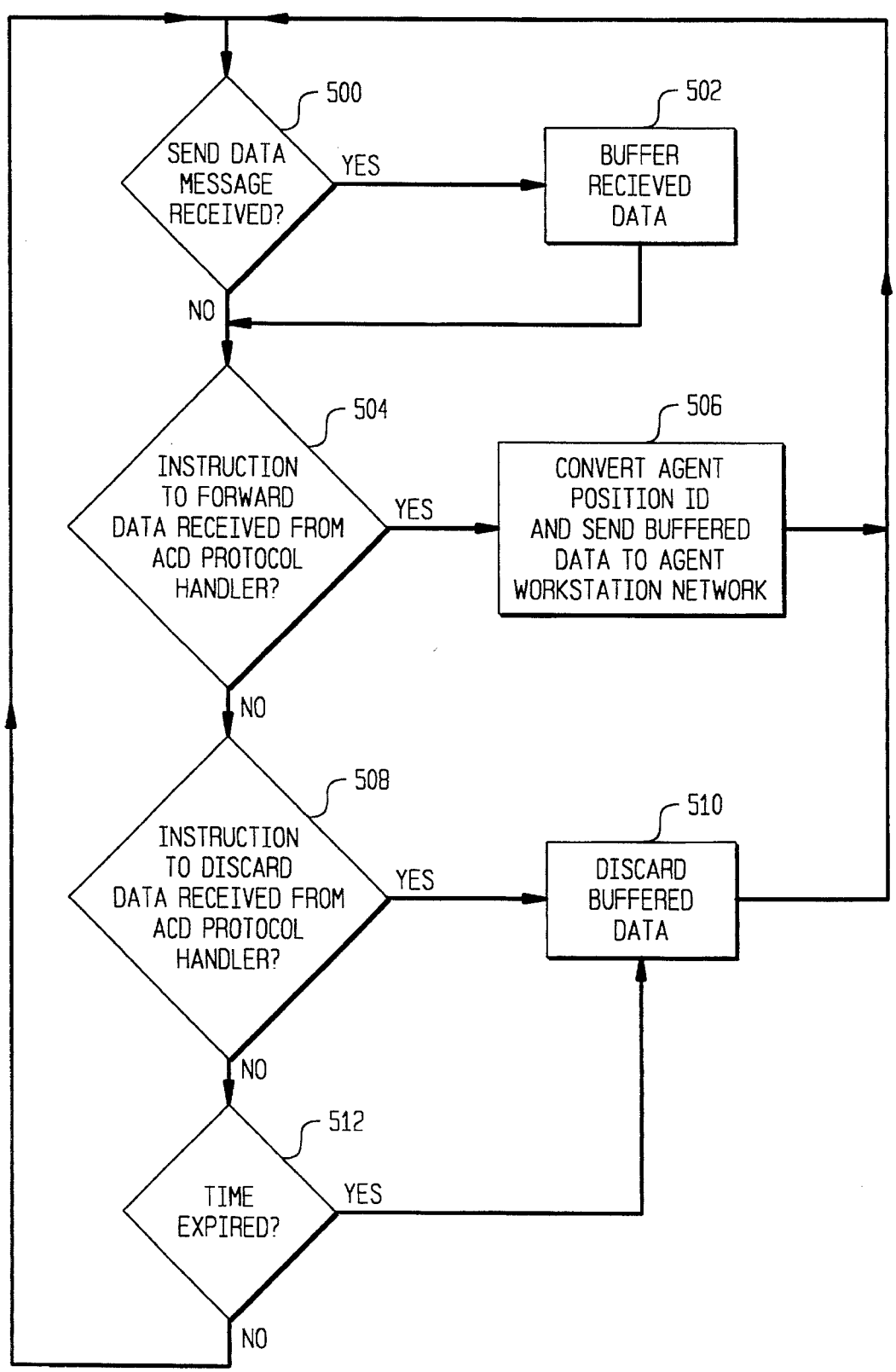
FIG. 12 is a flowchart showing the operation of agent protocol handler 127.

The manner in which the obtained data and the call are routed to agent workstation 116 will now be described with reference to FIGS. 10–12. FIG. 10 is a flowchart showing the operation of ACD 108. FIG. 11 is a flowchart showing the operation of ACD protocol handler 125. FIG. 12 is a flowchart showing the operation of agent protocol handler 127.

ACD 108 generally waits for calls to be routed (step 300). When IP 104 receives an instruction from SCP 102 to route a call to a particular agent or group of agents, the IP 104 utilizes the Public Switched Telephone Network to transfer the call to the ACD 108. When the ACD 108 receives the call, it places the call in a queue established for the appropriate agent or group of agents that provide the requested service (step 302). The ACD queue includes the telephone number provided by the caller, an internal caller ID, the status of the queued call, and the time the call was entered into the queue. Once the call is entered in the queue, ACD 108 sends a PROMPT message to ACD protocol handler 25 (step 304) including the account number entered by the caller and the internal caller ID.

ACD 108 then maintains the call in the queue until one of the following events occurs: (1) an agent becomes available to take the call (step 306); or (2) the caller abandons the call (step 314).

When an agent becomes available, ACD 108 routes the call to that agent workstation 116. At the same time, ACD 108 updates the status of the call in the queue from "waiting" to "connected" (step 307) and sends a CONNECT message to ACD protocol handler 125 (step 308) including the internal call ID and the position ID of the agent workstation 116 to which the ACD 108 routed the call.

ACD 108 informs ACD protocol handler 125 when a call is completed by issuing a DISC message to ACD protocol handler 125 (step 312), including the internal caller ID. In the event a caller abandons a call, ACD 108 sends an ABAND message (step 316) including the internal caller ID to ACD protocol handler 125.

Referring to FIG. 11, in response to a PROMPT message (step 400), ACD protocol handler 125 maps the received account number and internal caller ID in a table (step 402). If ACD protocol handler 125 does not receive a prompt message (step 400) and after step 402, ACD protocol handler 125 looks for a CONNECT message (step 404). Upon receiving the CONNECT message, ACD protocol handler 125 forwards the agent position ID and the corresponding account number to agent protocol handler 127 (step 406). ACD protocol handler 125 then determines whether a DISC message has been received (step 412). If so, it translates the internal caller ID to the corresponding account number (step 409) and instructs agent protocol handler 127 to discard any buffered data associated with that account number (step 410). ACD protocol handler 125 contains processing by determining whether an ABAND message has been received (step 408). If so, it converts the internal caller ID to the corresponding account number (step 407) and instructs agent protocol handler 127 to discard any buffered data associated with the corresponding account number (step 410).

Referring now to FIG. 12, when agent protocol handler 127 receives an instruction from GDI 124 to send data to an agent (step 500), agent protocol handler 127 buffers the received data in correspondence with the account number provided by the caller (step 502).

In response to an instruction to forward data from ACD protocol handler 125 (step 504), agent protocol handler 127 obtains a workstation Internet Protocol address corresponding to the agent position ID utilizing a Domain Name Service (DNS) (step 506). The agent protocol handler 127 then sends the collected data corresponding to the account number received from ACD protocol handler 125, to agent workstation network 115.

Agent workstation network 115 reads the address attached to the data message and routes the information to the display terminal 119 of the agent workstation 116 to whom ACD 108 routed the call. In this manner, delivery of data to the workstation of agent workstation 116 can be coordinated with the routing of the call to the same service agent. Thus, service agents may serve customers more effectively and efficiently.

Because the data to be sent to an agent may be too lengthy to include in a single TCAP message sent from MSAP 120 to GDI 124, it may be necessary for MSAP 120 to send the data to GDI 124 in a series of messages. In this case, any messages required after the first messages are sent preferably include a tag identifying the subsequent messages as a continuation of the previously sent message. Agent protocol handler 127 accumulates the data contained in these multiple messages, strips the tag number attached to the subsequent messages, and sends the data to the agent workstation network 115 in a single message.

Agent protocol handler 127 maintains the data in the buffer until a message is received from ACD protocol handler 127 instructing agent protocol handler 127 to discard the data (step 508) or until a predefined period of time expires during which the data has been buffered (step 512). In either event, agent protocol handler 127 discards the buffered data (step 510).

The purpose of the time limit, as well as that of the other time limits discussed above, is to ensure that the queues and buffers do not become overloaded due to queued calls and buffered data that, for some reason, were not properly discarded when a call was abandoned or discontinued. The times entered into the various queues of the above described system may be provided by a common time server. Preferably, a Network Time Protocol (NTP) is utilized to synchronize off a common time server.

While there has been illustrated and described what are at present considered to be preferred implementations and methods of the present invention, it will be understood by those skilled in the art that various changes and modifications may be made, and equivalents may be substituted for elements thereof without departing from the true scope of the invention.

For example, although the present invention has been described utilizing a separate agent telephone 117 and agent display terminal 119, as well as separate communications links connecting the system to the agent telephone 117 and agent display terminal 119, those of ordinary skill in the art will appreciate that agent telephone 117 and agent display terminal may be integrated in a single communication terminal, and that the voice signals from the caller and the data from SCP 102 may be delivered over a single Integrated Services Digital Network (ISDN) line.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

We claim:

1. A method of processing a phone call from a caller in a telephone network, the telephone network including a plurality of switches and an intelligent peripheral (IP) for interfacing the plurality of switches with a service control point (SCP), the method comprising the steps of:

receiving the phone call at one of the plurality of switches;

forwarding the phone call to the IP;

requesting, by the IP, that the SCP perform a call processing request;

accessing service logic within the SCP, the service logic specifying handling of the phone call according to the call processing request;

requesting, by the service logic, data from one or more external systems;

receiving, at the SCP, data from the one or more external systems in response to the service logic request;

routing the phone call to a selected telephone based on the data received from the one or more external systems; and routing the received data to the selected telephone.

2. The method of claim 1, wherein the data received from the one or more external systems includes any of account status data, repair information, customer profile data, and ordering information.

3. The method of claim 1, wherein the step of accessing the service logic is performed by a Multi-Services Application Platform (MSAP), and the step of requesting data from the external systems is initiated by the MSAP and comprises the substeps of:

the MSAP issuing a data request to a generic data interface (GDI), the MSAP and GDI being connected through a message delivery interface (MDI), the GDI performing the steps of:

forming sub-requests from the received data request;

forwarding the sub-requests to the one or more external systems;

receiving replies to the sub-requests from the one or more external systems; and returning a message to the MSAP containing the requested data.

4. The method of claim 1, wherein the SCP includes a Multi-Services Application Platform (MSAP) and a message delivery interface (MDI) for interfacing the MSAP to a generic data interface (GDI), and wherein the step of accessing the service logic is performed by the MSAP, and includes a step of sending data initiated by the MSAP comprising the substeps of:

the MSAP issuing a send data request to the GDI;

the GDI forming sub-requests in response to the received send data request;

the GDI forwarding the sub-requests to one of the external systems;

the GDI receiving status information concerning each sub-request; and the GDI returning a message to the MSAP containing a status of the send data request.

5. The method of claim 1, further comprising the steps of:

entering the received phone call in a queue; and storing the received data, wherein the received data is routed to the selected telephone at substantially the same time that the call is routed to the selected telephone.

6. The method of claim 5, further comprising the steps of:

discarding the stored data when the received phone call is disconnected or abandoned.

7. The method of claim 1, further comprising the steps of:

playing recorded voice messages to the caller when the phone call is received; and receiving caller information from the caller.

8. The method of claim 1, wherein the step of routing the data to the selected telephone comprises the substeps of:

waiting for a message indicating that the received phone call has been connected to the selected telephone, the message including an account number corresponding to the received data and an identifier of the selected telephone to which the telephone call has been routed;

obtaining a network address for the selected telephone to which the telephone call has been routed based upon the identifier included in the message; and forwarding the received data to the selected telephone at the obtained network address.

9. The method of claim 1, further including the steps of:

outputting, from the SCP, interface instructions to the IP; and performing, by the IP, the interface instructions.

10. The method of claim 9, wherein the interface instructions include information requests to the caller.

11. The method of claim 1, wherein the telephone network includes an automatic calling device (ACD), and the method further includes the step of the SCP instructing the IP to route the telephone call to the ACD.

* * * * *